United States Patent [19]  
Yaniv et al.

[11] Patent Number: 4,827,084  
[45] Date of Patent: May 2, 1989

[54] SOLID STATE IMAGE DETECTOR AND SIGNAL GENERATOR

[75] Inventors: Zvi Yaniv, Farmington Hills; Clive Catchpole; Vincent D. Cannella, both of Birmingham; John C. McGill, Lake Orion; Mike Prewarski, Troy; Ronald G. Mulberger, Sterling Heights, all of Mich.

[73] Assignee: Ovonic Imaging Systems, Inc., Troy, Mich.

[21] Appl. No.: 122,990

[22] Filed: Nov. 19, 1987

[51] Int. Cl.$^4$ ............................................. G08C 21/00
[52] U.S. Cl. ........................................ 178/18; 178/20
[58] Field of Search ............. 178/18, 19; 252/62.3 R, 252/62.3 V

[56] References Cited

U.S. PATENT DOCUMENTS 4,622,437 11/1986 Bloom et al. ........................ 178/18

Primary Examiner—Stafford D. Schreyer
Attorney, Agent, or Firm—Richard M. Goldman; Marvin S. Siskind; Kenneth M. Massaroni

[57] ABSTRACT

A solid state, touch sensitive position sensor, which sensor includes a conductive surface along the boundaries of which are disposed at least two sets of two elongated current distribution and collection means. The touch sensitive position sensor further includes resistance means operatively disposed so as to interconnect said current distribution and collection means with said conductive surface. The current distribution and collection means and resistance means are configured, so as to (1) provide a substantially linear electric field distribution of equipotential lines and (2) sequentially turn one set of said current distribution and collection means on while turning the other sets off. In an important embodiment, the conductive surface is formed immediately atop a copyboard and by utilizing erasable, felt tip markers having metallic inserts therein, visual images as well as electrical signals, indicative of X-Y coordinate location, may be simultaneously generated.

21 Claims, 4 Drawing Sheets

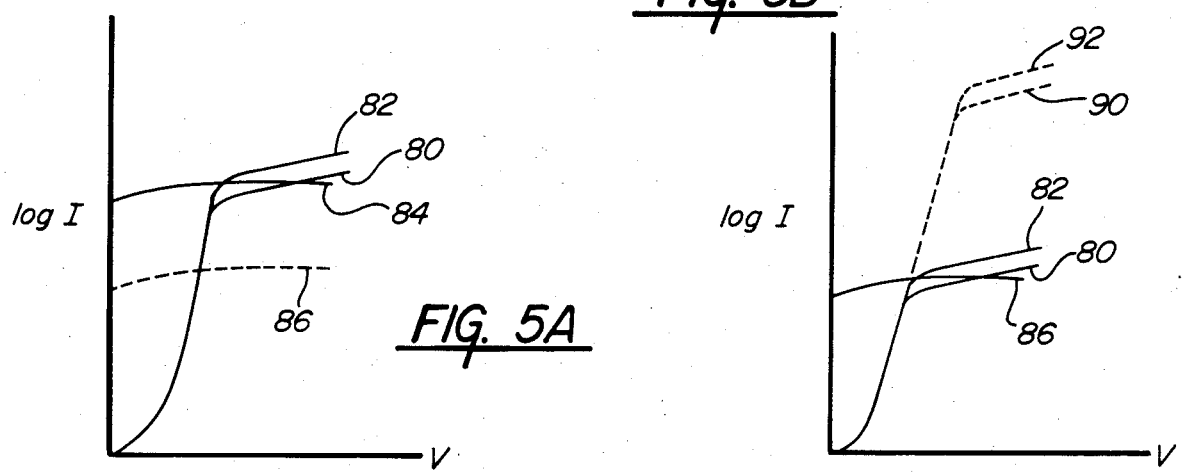
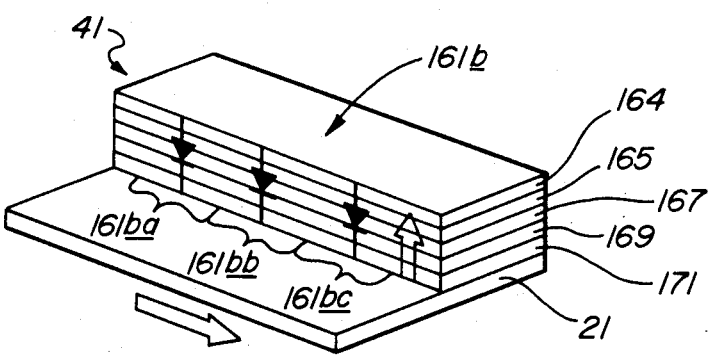
FIG. 6
FIG. 7
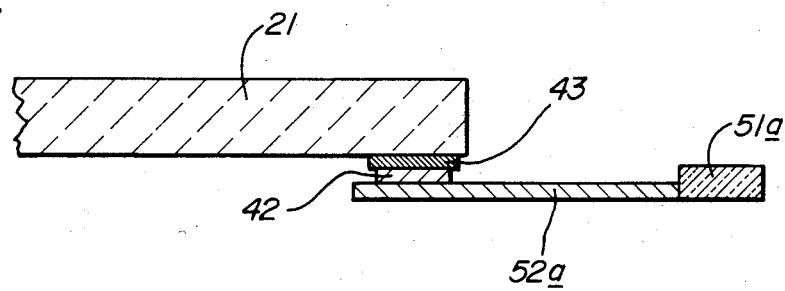

SOLID STATE IMAGE DETECTOR AND SIGNAL GENERATOR

FIELD OF THE INVENTION

The present invention relates generally to electronically operated data input and display systems, and more particularly to touch sensitive position sensors. The electronic touch sensitive position sensors described hereinafter are adapted to simultaneously and accurately digitize visually detectable information as that information is entered upon the electrically conductive surface thereof. Such information not only becomes immediately available for visual detection but also becomes electronically available for downstream storage, display, reproduction and/or information processing.

BACKGROUND OF THE INVENTION

Electronic devices capable of digitizing and reproducing information manually entered upon an electrically communicative surface are relatively new to the field of information processing. Previous devices of this type fall generally into one of two categories; digitizing tablet systems and electronic copyboards, both of which possess significant technological limitations as compared to the abilities provided by the electronic touch sensitive position sensor of the present invention.

Digitizing tablet systems of the prior art generally include an electrically conductive, X-Y grid like structure of wires underlying an exposed data entry and display surface associated therewith and a stylus mechanism which is coupled to the grid structure. The stylus mechanism may be inductively, resistively or capacitively coupled to the grid structures. The grid structure typically includes two sets of wire loops operatively oriented so as to form the horizontal (X coordinate) and vertical (Y coordinate) input lines of the grid for accurately determining the X-Y location of the stylus mechanism relative to the data entry surface.

The stylus mechanism is generally shaped in a pen-like or pointer-type of configuration. When the stylus is inductively coupled, it includes within the body thereof at least one electric coil, which coil may be inductively coupled to the grid by energizing either the coil or the grid with an A.C. voltage. Alternatively, the stylus may be conductively coupled to said grid structure and include contact means to a common or ground.

Each of the aforementioned wire loops which define the grid provides a discrete sensor for uniquely determining the X-Y location of the stylus on the data-input surface of the tablet. The X-Y location is determined by processing data signals generated when the stylus mechanism is brought into contact with the particular set of wire loops of the grid. However, in order to obtain the precise location of the stylus mechanism on said tablet surface, it is necessary to filter and demodulate the electrical signals generated by the wire loops. Further, the grid is subject to both inductive and capacitive interference by objects carrying an electric field (such as a radio or lighting). Thus, in order to achieve optimum accuracy in X-Y location determination, it is necessary to shield the grid from such externally introduced, performance degrading interference.

Prior art electronic digitizing tablets of the type described hereinabove rely upon coupling between said stylus mechanism and said electric grid in order to determine the X-Y location of information introduced onto the input surface thereof. Another, and more favored type of electronic digitizing tablet relies upon the interference created when a conductive stylus structure interacts with an electric field applied across the conductive, data input surface associated therewith. It is this electric field disturbance which is used to determine the X-Y location of information touch inputted onto, i.e. contacting, the input surface. While this field disturbing method has several advantages over the inductive contact method, it also suffers from different, but substantial limitations. Chief among these limitations is that the electric field established across the conductive, data input surface of the touch sensitive sensor is not perfectly linear, which non-linearity results in errors in the determination of the unique X-Y location (relative to the data input surface) of said inputted information. In the case of very low resolution touch sensitive sensors, minor field non-linearities can be tolerated; however, as should be apparent, as the resolution of the touch sensitive surface of said touch sensitive sensors increases (up to perhaps a resolution of 100 lines/in.), the greater the likelihood that even minor non-linearities in the electric field distribution will result in erroneous X-Y location determination. In order to compensate for errors which arise due to field non-linearity, the digitizing tablets of the prior art found that it was necessary to utilize special data processing techniques, which techniques added significant cost and complexity to the tablet.

In an effort to avoid the use of said special data processing techniques, the ohmic contact touch sensors of the prior art attempted to provide a more uniform or linear electric field distribution across the data input surfaces thereof. The field linearization was accomplished by employing special current distribution techniques. More particularly, the conventional manner of establishing a uniform electric field was to operatively dispose elongated current contacts along the boundaries of the conductive input surfaces of the sensors. However, such elongated current contacts were inherently maintained at an equipotential at all points along the length thereof. Since such contacts were equipotential, sensing the position of a touch input by detecting current differences existing at specific points along the length of the contact was impossible.

The prior art next attempted to provide a uniform electric field distribution across the conductive surface in a manner which would enable the accurate touch point location determination by forming a series of parallel rows of a plurality of short, conductive segments printed upon or overlaid onto said conductive input surface. The plurality of short segments not only provided for a more uniform field distribution, but allowed for those same segmented conductors to perform the position sensing function. An example of such a prior art system is U.S. Pat. No. 4,371,746 issued on Feb. 1, 1983 and entitled "Edge Terminations For Impedance Planes", the disclosure of which is incorporated herein by reference. Such segmented conductors did not provide perfect uniformity of the electric field and were expensive to implement. Note that the current distributors (segmented conductors) of such prior art systems were isotropic in current conduction behavior, i.e., the inherent electrical conductivity of said current distributors is substantially the same in all directions.

It should be noted that the necessity of providing a uniform and linear electric field distribution across the conductive surface of the sensor cannot be overemphasized. By way of example, assume that a potential of 10 volts is placed across that conductive surface (the segmented conductors at one boundary are at a +10 volt potential and the segmented conductors disposed at the opposite boundary are at a 0 volt potential). It is necessary that the potential taken at any point between those two sets of segmented conductors vary linearly. In this manner, a touch input half way therebetween would be a potential of 5 volts or a touch point three quarters of the way therebetween would be at a potential of 7.5 volts. Obviously, deviations from this linearity would adversely effect the accuracy of the determination of X-Y location.

One object of the present invention is to provide; (1) a more linear electric field distribution across the conductive surface of a touch sensitive position sensor; and (2) more accurate detection of information input upon said conductive surface. It is to be noted that anisotropic current distribution and collection is an important feature of the instant invention. Anisotropic current distribution, as used herein, will refer to the distribution of current across the conductive surface of a touch sensitive input sensor, which distribution is characterized by relatively good electrical conductivity, i.e. low impedance, in a first direction and relatively poor electrical conductivity, i.e. high impedance, in a second direction.

It is important to understand that the x and y coordinates of a touch point are substantially simultaneously sensed. During a given electronic scan cycle of the circuitry (of which there are typically 200 per second), one half of the cycle is dedicated to determining the x coordinate and the other half cycle is dedicated to locating the y coordinate. Specifically, during the first half cycle, i.e., from a first to a second clock pulse the electronic field is distributed in the y direction, by applying a forward biasing current to the current control means associated with the y field current distribution and collection means, and a reverse biasing current to the current control means associated with the x field current distribution and collection means. In this way the location of the touch point in the y plane may be located. During the second half cycle, i.e., from the second clock pulse to a third clock pulse, the current control means associated with the x field current distribution and collection means is forward biased while the current control means associated with the y field current distribution and collection means is reverse biased thus allowing the detection of the location of the touch point in the x plane.

With respect to the electronic copyboards, referred to hereinabove, visually detectable information may be manually entered onto the display surface (whiteboard surface), as by standard, dry erasable felt-tip markers. The visually detectable information is then digitized either by scrolling the visually detectable information past a stationary array of photosensitive elements or by passing an array of photosensitive elements mounted in a moveable arm over said information-bearing whiteboard surface. In either case, the visually detectable information cannot be digitized at the same time that it is being manually input onto said surface. Electronic whiteboards can thus be understood to utilize a two-step process in which information is first written thereupon which information can only be subsequently digitized.

More particularly, electronic imaging systems associated with whiteboards generally include either an array of photosensitive elements such as photosensors or an optical system with a charge coupled device, a data input surface upon which images or characters may be entered; a light source operatively disposed so as to illuminate the image-bearing surface being scanned, and means for effecting relative motion between the array of photosensitive elements and the image-bearing surface.

In operation, radiation provided by the light source is reflected from the image-bearing surface, the intensity of which reflected radiation varies depending upon the nature of the visual information disposed upon the surface. Dark portions of images on the surface will reflect less light than brighter portions; thus, images entered upon the surface as by a felt-tip marker, will reflect less light than areas of the surface not bearing an image. The photosensitive elements are then able to effect a detectable change in an electrical parameter, such as conductivity, in direct response to the amount a reflected light incident thereupon. This change e.g., in conductivity, is detected and relayed in the form of electrical signals for downstream processing. Said downstream processing is adapted to correlate the electrical signals received from the photosensitive array relative to the image-bearing surface. In this manner, the location and nature of the information on the information bearing surface of the whiteboard can be accurately displayed. Such electronic whiteboards are fully disclosed in commonly assigned U.S. patent application Ser. No. 885,907 filed July 15, 1986 and entitled: "Photosensitive Line Imager Utilizing A Moveable Scanning Arm" now U.S. Pat. No. 4,725,889, the disclosure of which is incorporated herein by reference.

It is noteworthy that all of these aforementioned electronic digitizing devices have gained some measure of commercial acceptance despite inherent technological limitations. The prior art electronic whiteboards all require cumbersome mechanical apparatus for effecting relative motion between the arrays of photosensitive elements and the image-bearing surface to be scanned. The mechanical apparatus for accomplishing relative motion are relatively complex and expensive, both in terms of the initial purchase price and the ongoing cost of servicing. Electronic digitizing devices of the prior art are further limited in their ability to digitize and reproduce color images, said devices often requiring multiple passes over the image-bearing surface relative to a plurality of arrays of photosensitive elements, each array sensitized to different portions of the electromagnetic spectrum. Finally, said prior art electronic digitizing devices are unable to instantaneously (i.e., in real time) digitize electronic signals from information entered upon the whiteboard surface; rather, the information can be digitized only after manual data input is completed and a scan cycle has been initiated. Thus, an unnecessary time delay is always present and the possibility exists if losing information due to inadvertent erasure from the image-bearing surface prior to the initiation of the reproduction process.

It is a further object of the present invention to provide a solid state copyboard having no moving parts and capable of the instantaneous display of visible information marked upon the surface thereof.

BRIEF SUMMARY OF THE INVENTION

The aforementioned, as well as other, shortcomings of the prior art are obviated by the totally solid state, electronic touch sensitive position sensor and totally solid state data, electronic input and display system provided by the present invention.

The present invention discloses a touch sensitive position sensor not only capable of simultaneously displaying information both visually and electrically entered thereupon, but also capable of reproducing that information in a very accurate manner. Therefore, the position sensor of the present invention is relieved of the limitations inherent in previous electronic systems and thus, represents a significant advance in the field of electronic data input and display devices.

The electronic touch sensitive position sensor described herein includes a bounded, conductive, polygonal image-bearing surface that is specifically designed for detecting the X-Y location of touch points marked thereupon. The position sensor of the instant invention further includes at least two sets of current distribution and collection means for establishing an electric field across the conductive surface thereof, the established electric field having a substantially linear field distribution of equipotential lines. Also, important in establishing substantial uniformity in the distributed electric field is the presence of a resistance means operatively disposed between said current distribution and collection means and the bounded conductive surface. The position sensor also includes current control means operatively associated with said current distribution and collection means, and adapted to sequentially switch said current distribution and collection means from a first to a second condition (i.e., an off to an on condition). The touch sensitive position sensor is adapted to sense the location of a touch point, and to translate that information into a precise X-Y coordinate of that touch point relative to the conductive surface.

Of critical importance to the operation of the touch sensitive position sensor disclosed herein is the establishment of a uniform electric field across the electrically conductive surface thereof. The mechanism for establishing the electric field includes at least two sets of current distribution and collection means, wherein one of each set is disposed along one of the opposing boundaries of the conductive surface of the position sensor, each being operatively disposed parallel to one another so as to establish an electric field across both the x and y plane of the conductive surface. The mechanism further includes resistance means electrically interconnecting the current distribution and collection means with the conductive surface. The current distribution and collection means and the associated resistance means cooperate so as to provide a substantially uniform field distribution, i.e., a linear electric field distribution with substantially parallel equipotential lines across the entire conductive, image-bearing surface of the touch sensitive position sensor.

As will be discussed in greater detail hereinafter, the preferred current distribution and collection means is a diode, though other devices, such as an off-stoichiometric SiNx switch, may function equally well. The current distribution and collection means may also be anisotropic in nature, said anisotropy arising from the high impedance thereof to the flow of electrical current in a direction perpendicular to the intended direction of current flow on the conductive surface of the position sensor, i.e., in a direction substantially parallel to the lines of equipotential on the conductive surface of the sensor. This anisotropic conductivity provides for relatively low impedance to current conduction in a first direction and relatively high impedance to current conduction in a second direction.

In the preferred embodiment, the current distribution and collection means may be a distributed diode, e.g., an elongated distributed diode, comprising a plurality of thin film layers of semiconductor alloy material, such as silicon alloy material deposited on a common substrate. In one species of this embodiment, the distributed diode may be sub-divided into a plurality of discrete diodes and attached directly upon the conductive surface of the position sensor. In a further species, the current distribution and collection means of the instant invention may be interconnected to the surface of said position sensor by an elongated, electrically resistive polymeric matrix having electrically conductive material distributed therein.

In a further preferred embodiment, a resistance means is interconnected between said current distribution and collection means and said bounded conductive surface. The resistance means is useful in establishing a uniform, substantially linear field distribution, and must be capable of providing a resistance within a range, the optimum value of which depends upon the resistivity of the conductive surface of the position sensor, which may typically be within 50 to 500 ohms. The elongated, electrically resistive polymeric matrix described hereinabove may be employed as said resistance means since the resistance inherent therein is within the prescribed range.

In another species of this embodiment, a resistor, such as a thick film resistor may be attached directly to the conductive leads of said current distribution and collection means, both of which may then be attached directly to said conductive surface as by an electrically conductive adhesive, adapted to conduct the flow of electricity in a single direction, and prevent electrical conduction in at least a second direction perpendicular to the direction of electrical conduction.

The touch input position sensor of the instant invention is particularly useful if employed so as to form a solid state data input and display device of the aforementioned "electronic copyboard" type. In an electronic copyboard (or otherwise referred to as whiteboard), as described in the previous Background section, visually detectable data images are written onto the exposed surface thereof, for example by felt-tip markers. Thereafter, those visually detectable data images are scanned and digitized, for example by an elongated array of thin film photosensitive elements. In electronic copyboards of the prior art, visually detectable, physical data images could only be physically scanned and converted to an electrical signals after the physical entry of the data had been completed.

By way of contrast, in the solid state data image input and display system of the instant invention, it is possible to obtain the substantially simultaneous, i.e., real time, creation of visually detectable data images (as by marker or crayon entry on a copyboard surface) and the generation of electrical signals corresponding thereto. This is accomplished without fiber optics, movable board surfaces, or movable arrays of photosensitive elements. The solid state copyboard image input and display system of the instant invention utilizes an electrically conductive image input and display surface; which surface may actually be a multi-layered composite adapted to have data entered thereupon. The data that is entered on the surface is simultaneously (electrically and visually) detectable. Each point of information entered upon the surface of the electronic copyboard corresponds to a unique x-y coordinate on the board. Thus, signals are generated corresponding to at least the x-y location of the visually detectable, physical representation of the data image.

The electrical signal generated by the solid state touch sensitive position sensor of the instant invention may be placed in electrical communication with an electrophotographic printer, a laser printer, a telecommunication system, a modem, a computer, a memory device, or other downstream signal processing equipment. Further, the electrical signal may provide color, pitch, hue, or gray scale information.

BRIEF DESCRIPTION OF THE DRAWINGS

The invention may be best understood by reference to the following Figures appended hereto, which Figures will be briefly described in this section.

FIGS. 5A and 5B illustrate a pair of I-V curves which are characteristic of distributed diodes of the type employed in the position sensor described herein; specifically, the charts illustrate means by which to avoid "downstream" correlation errors by increasing the resistivity of the conductive surface of the position sensor as shown in FIG. 5A or by changing the I-V curve characteristic of the diode as shown in FIG. 5B;

FIG. 6 is a perspective view, partially in cross-section, illustrating a preferred embodiment of an elongated, solid state diode current distribution (or collection) means which is utilized to linearize the distribution of electric field lines across the conductive surface of the touch sensitive position sensor of the instant invention;

FIG. 7 is a perspective view, in cross section of the touch sensitive position sensor, wherein a resistance means is disposed upon said current distribution and collection means, and attached to said conductive surface by a layer of electrically conductive adhesive;

DETAILED DESCRIPTION OF THE INVENTION

Figure 1:
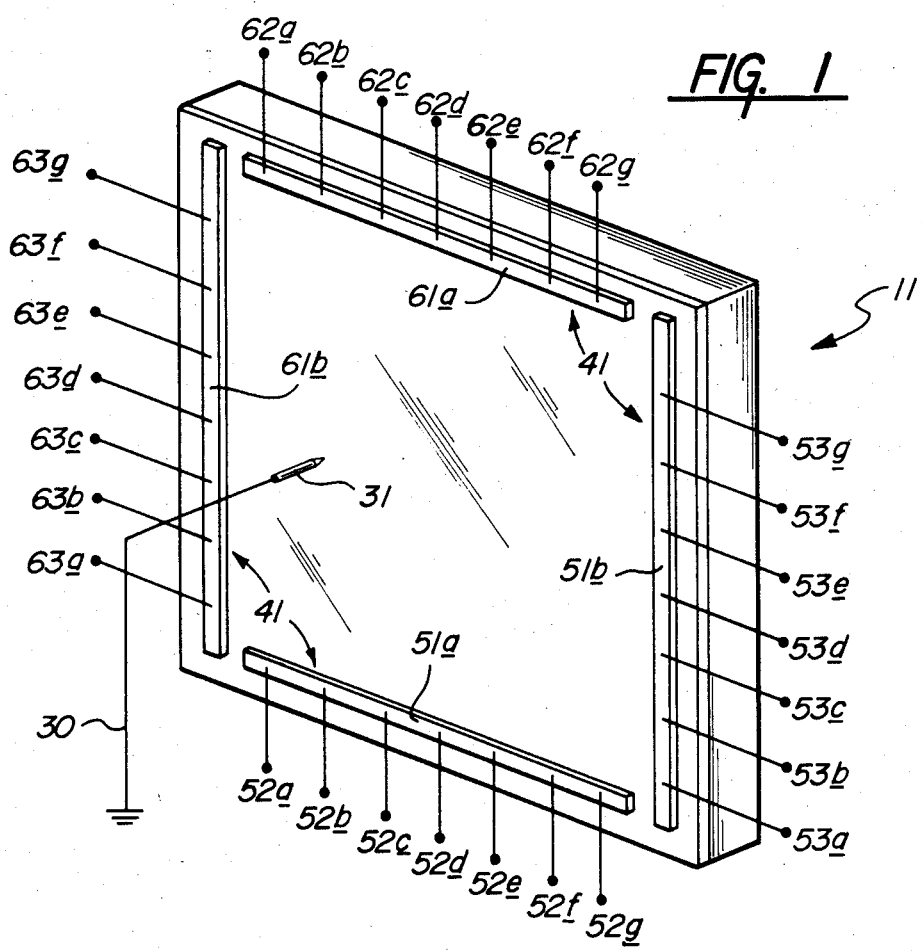
FIG. 1 is a perspective view of an improved, electronic, touch sensitive, position sensor, said sensor including the current distribution and collection means of the instant invention.

Turning now to the drawings, the improved, solid state, touch sensitive position sensor of the instant invention is indicated generally in FIG. 1 by the reference numeral 11. It is to be understood that while the description which follows relates to a rectangular-shaped input sensor surface, the position detection of touch input on any surface configuration is possible utilizing the concepts of uniform current distribution set forth herein. The position sensor 11 depicted in FIG. 1 includes a generally rectangularly-shaped, electrically conductive, exposed surface 21 that is specifically adapted for detecting and signalling the X-Y coordinate location of a touch point 31, such as the finger of a user or a stylus, placed in contact therewith.

In order to accomplish the function of touch point 31 location detection, the position sensor 11 includes at least two sets of current distribution and collection means, generally 41, for establishing a uniform linear electric field across the conductive surface 21 thereof. More specifically, the electric field distribution is established by a first elongated, current distribution means 51a, disposed along at least one boundary of the conductive surface 21 (such as the lower horizontal boundary thereof) and a first, elongated, current collection means 61a operatively disposed along at least a second boundary, parallel to and facing said current distribution means 51a, on the conductive surface 21 (such as the upper horizontal boundary thereof). It is thus seen that the first set of current distribution and collection means, 51a and 61a are preferably operatively disposed along two opposite boundaries of the conductive surface 21 of the position sensor 11 and are adapted to cooperatively provide a substantially uniform, linear electric field distribution of substantially parallel equipotential lines E (see FIG. 2) across that conductive surface 21. In a preferred embodiment, as described hereinafter, the current distribution and collection means are formed as distributed diodes, though other devices may be employed with equal success.

In the rectangularly-shaped, touch sensitive position sensor 11 illustrated in FIG. 1 the aforedescribed first horizontally disposed current distribution means 51a and the first horizontally disposed, but vertically spaced, current collection means 61a cooperate to establish a first uniform electric field distribution with a first set of horizontal equipotential lines so as to provide at least y axis coordinate location determination means of high resolution. The second set of current distribution and collections means 41 are required in order to provide a x axis coordinate location. More specifically, the second set of current distribution and collection means includes one elongated, current distribution and collection means 51b disposed along one vertical boundary of the conductive surface 21 and a second elongated, current distribution and collection means 61b disposed along the opposite vertical boundary of the conductive surface 21 horizontally spaced from said second current distribution means 51b. The second set of vertically oriented, spacedly positioned, current distribution and collection means, 51b and 61b, cooperate to establish a second set of uniformly spaced equipotential lines from a second electric field distribution orthogonal to the equipotential lines of the first field distribution so to provide x axis coordinate location determination means of high resolution.

The current distribution and collection means 51a, 51b, 61a, 61b contain a plurality of current leads (such as 52a, 52b, 52c . . . 52m; and 62a, 62b, 62c . . . 62m; 53a, 53b, 53c . . . 53m, and 63a, 63b, 63c . . . 63m) equally spaced along the lengths thereof. These current leads provide for the flow of electrical current through the current distribution and collection means to the conductive surface 21 of the position sensor 11, thereby establishing an electric field thereacross, which field initiates a flow of current between the oppositely disposed distribution and collection means (51a and 61a; 51b and 61b). In a preferred embodiment, the current leads are arranged in a configuration of approximately 40 lines per inch, though any given resolution (from 2 lines to 100 or more lines per inch) may be employed without departing from the scope of the invention. However, it is to be understood that the number of current leads per unit length is limited by the requirement that cross-talk between adjacent current leads must be prevented.

In the current distribution and collection means, the lateral distance between adjacent current leads is such as to provide relatively high impedance to current flow therebetween, as compared to the effective resistance path along the conductive surface 21 of the position sensor 11, whereby current is preferentially conducted in a direction other than along the length of the current distribution and collection means. The resolution (defined as the accuracy of determining a specific X-Y coordinate location of a touch input on the conductive surface) is determined by the uniformity and linearity of the field across the conductive surface, especially along edges of said surface nearest the disengaged current distribution and collection means, wherein the resistance means of said disengaged current distribution and collection means must be fairly high to avoid the flow of current thereinto.

Electrically interconnected with each of the current distribution and collection means, 51a, 51b, 61a and 61b, are current control means (not shown) adapted to sequentially turn on and off, in alternating manner, said sets of current distribution and collection means 41. As may be appreciated from the above described function of said current control means, said means must be capable of switching from a substantially on condition to a substantially off condition, without allowing any leakage of current therethrough while in its off state.

Figure 3:
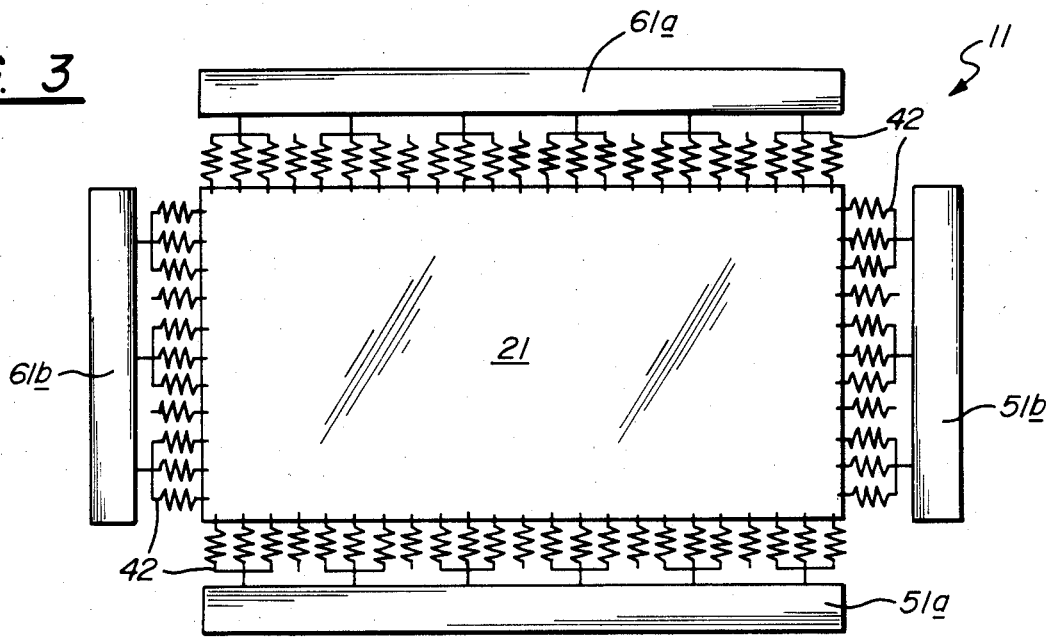
FIG. 3 is a schematic view of the touch sensitive position sensor, incorporating a resistance means interposed between said current distribution and collection means and said conductive surface.
Figure 4A:
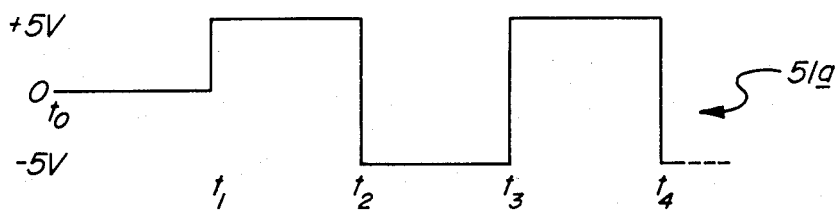
FIGS. 4A through 4D are a series of waveforms which illustrate the sequence of charging potentials applied to the current control means, and associated current distribution and collection means of the touch sensitive position sensor for alternately, sequentially scanning x-y fields of the touch sensitive sensor to determine the location of a touch point entered thereupon.
Figure 4B:
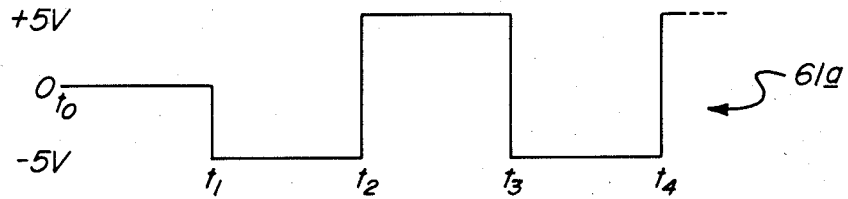
Figure 4C:
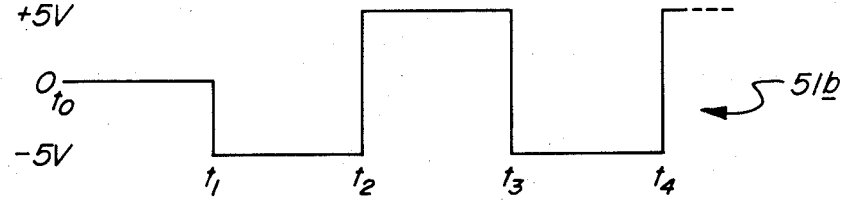
Figure 4D:
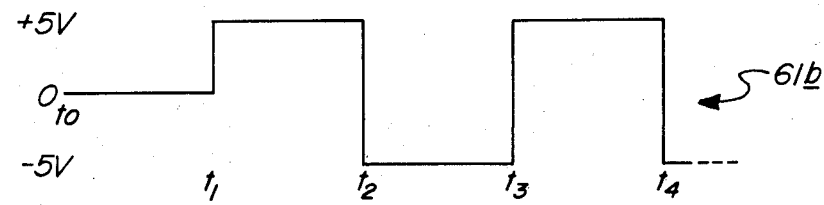

The touch sensitive position sensor further includes a resistance means electrically disposed between said current distribution and collection means and said bounded conductive surface. It is preferred that said resistance means be capable of providing resistance substantially the same as the resistance of the conductive surface 21, and typically within the range of 10 to 1000 ohms, and most preferably 50 to 500 ohms. Turning now to FIG. 3, there is illustrated therein a schematic view of he touch sensitive position sensor 11, including current distribution and collection means 51a, 61a, 51b, and 61b, having resistance means, generally 42 attached between said distribution and collection means and said conductive surface 21. The resistance means are attached to the current leads (such as 52a, 52b, 52c . . . ) of the current distribution and collection means. The resistance means are then affixed directly upon the conductive surface 21 of the touch sensitive position sensor 11.

The exact principle employed in electrically determining the x-y location of the touch point 31 can be best described as follows. The conductive surface 21 of the sensor 11 is continually scanned by a stream of discrete scanning cycles. The scanning cycles are triggered by associated timing means adapted to correlate the location of a touch point 31 with respect to the distributed electric field. Specifically, each scanning cycle, of which there are approximately 500 per second, (the actual number of scanning cycles per second is an independent variable which may be within the range of 10 to 10,000 cycles per second) comprises two half cycles; the first half cycle is dedicated to determining the y-axis touch point 31 location by energizing the first or y-axis current distribution and collection means, 51a and 61a, and the second half cycle is dedicated to determining the x-axis location of the touch point 31 by energizing the second or x-axis current distribution and collection means, 51b and 61b.

Turning now to FIG. 4, there is illustrated therein the waveform of voltages applied to the first or y-axis current distribution and collection means, 51a and 61a and the second or x-axis current distribution and collection means, 51b and 61b, to achieve alternating half cycle scanning. From time $t_o$ through $t_1$ all current distribution and collection means are held at an Ov potential as in the case where the touch sensitive position sensor is in its off mode. At time $t_1$ through $t_2$, in order to determine the y-plane location of the touch point 31, the current control means associated with current distribution means 51a and current collection means 61a are switched into an on or forward biased condition by applying voltage of +5 v and −5 v thereto respectively. This allows a uniform electric field to be distributed across the display surface 21 of the touch sensor. At the same time, ($t_1$ thru $t_2$) the current control device associated with current distribution and collection means 51b and 61b are in an off or reversed biased condition, as shown in FIG. 4, by applying voltages such as −5 v and +5 v thereto respectively (the voltages applied to said diodes being substantially equal in magnitude and less than the reverse bias breakdown voltages of said diodes). Thus, no charge is distributed across the display surface in the y-plane thereof during the first half cycle of a complete scanning cycle. During the second half cycle, the current control device associated with current distribution and collection means 51b and 61b switch said current distribution and collection means into an on or forward biased condition by reversing the voltages applied thereto during the first half cycle, while the current control devices associated with current distribution and collection means 51a and 61a are switched into an off or reverse biased condition, again by reversing the voltage applied thereto during the first half cycle. Biasing the diodes in this way provides for scanning in the x-plane of the position sensor 21, and thus, allowing for determining the x-plane location of the touch point 31. It is important to note that these scanning cycles are continually being initiated so as to constantly update the location of all information entered upon the display surface 21.

The correlation of the location of the touch point 31 relative to the distributed electric field is accomplished by means adapted to correlate the location of the touch point 31 to the field distribution, which compares the x-plane and y-plane location of the touch point 31 to the overall field, thereby precisely pinpointing the location of the touch point 31. As illustrated in FIG. 3, the scanning cycles are initiated at all times while the sensor 11 is in operation, thus continually updating the status of the input information. Further, as should be apparent, the preferred current control device must be capable of being switched from an off to an on condition.

Figure 2:
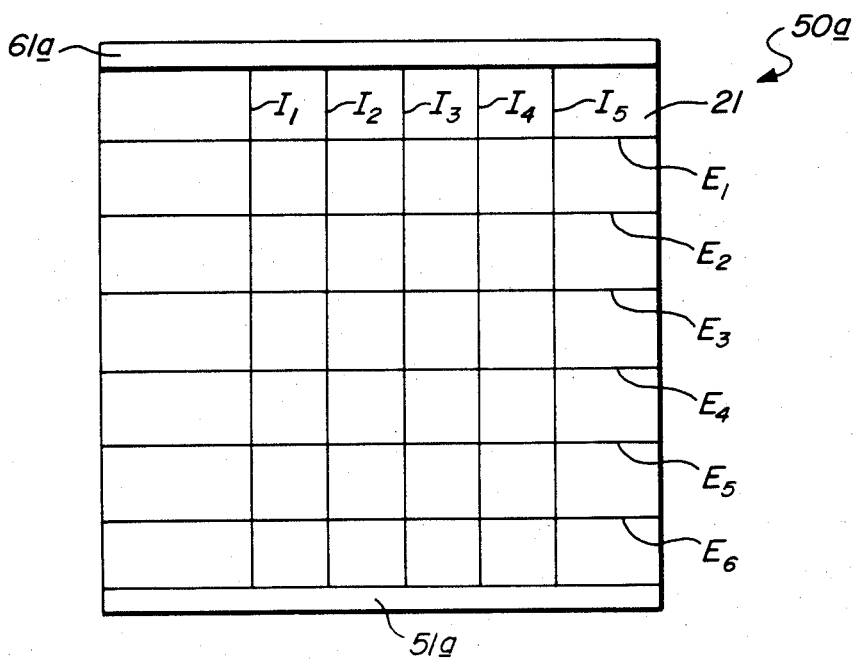
FIG. 2 is a stylized current and potential map which illustrates the uniform distribution of electric field lines established by the current distribution and collection means across one field of the conductive surface of the touch sensitive position sensor of the instant invention.

As mentioned hereinabove, the alternating electrical fields so established are distributed in the manner shown in FIG. 2. In FIG. 2, the equipotential lines E are substantially parallel. It is necessary to obtain this high degree of field line parallelism and orthogonality in order to provide an electric field of sufficient linearity and uniformity, which uniformity and linearity is necessary for determining the precise location of the x-y position of data input upon the touch sensitive position sensor.

As was also mentioned hereinabove, the problems associated with maintaining field uniformity become particularly acute close to the peripheral edges of the display surface 21. Specifically, there is a propensity for the electric field to bend, warp or fringe towards the ends of the current distribution means, which propensity is dependent upon the diode's IV characteristic, specifically, the region in which the ohmic losses due to high carrier injection begins to become significant, and in which voltage begins to increase rapidly as compared to the current, (the bulk limited region). These problems result in erroneous information being received by the current collection means, and thus inaccurate determination of touch point 31 location. This problem is ameliorated however, by employing current control diodes of substantial uniformity as disclosed herein. The diodes however must be extremely uniform, i.e., a variance in both reverse breakdown potential, and forward impedance of less than 1% per diode. Uniformity levels this high however, significantly decrease the yield of usable diodes which may be used in conjunction with the sensor 11 (and therefore increase the cost of manufacture).

Alternatively, the instant inventors have found at least two other means by which to improve the uniformity of the applied fields without having to improve the uniformity of the diodes. First, the inventors have found that it is possible to increase the resistivity of the display surface 21 of the sensor 11 so as to insure that the diodes disposed on the display surface 21 will all operate below the onset of bulk limited behavior. The resistance of the display surface 21 may easily be increased, for example, by increasing the amount of oxygen present in it, thereby making it more glass-like, and therefore more insulative. This may be accomplished simply by slowing the rate of deposition at which the conductive surface of the touch sensitive positive is deposited or alternatively by increasing the temperature at which the deposition occurs (or a combination of both). A preferred value for resistance of the conductive surface 21 of the position sensor 4 is a resistance within the range of 20 to 5000 ohms per square, and preferably within the range of 100 to 300 ohms per square.

Turning to FIG. 5A, there is illustrated therein, in graphic fashion, the I-V curve of two similar diodes 80 and 82. The difference in I-V characteristic observed for diodes 80 and 82 is attributable to minor thickness variations (i.e., greater than 1% and less than 5%) in the fabrication of said diodes. The resistance of the conductive surface 21, to which said diodes 80 and 82 are associated, is represented by line 84, which line passes through the linear portion of diode 82's I-V curve, and through the bulk limited region of diode 80. This lack of uniformity of diode I-V characteristic results in the problems discussed hereinabove. This problem is solved however by increasing the resistance of the conductive surface, as indicated by line 86 (in phantom) so that less current flows across the conductive surface and therefore substantially all diodes associated with the conductive surface are operating in the linear portion of their characteristic I-V curve.

Alternatively or additionally a second method by which to relieve the hereinabove discussed problems associated with the operation of said diodes in the bulk limited region thereof, requires that diode thickness, which is typically in the range of 500 to 15,000 angstroms, be reduced e.g., by approximately one half, with substantially all of the reduction in thickness taken from the intrinsic region thereof thus resulting in diodes approximately 250 to 7,500 angstroms thick, (a preferred method of fabricating diodes is set out in detail hereinafter). By so doing, the onset of bulk limited behavior occurs at higher voltage levels, thereby allowing for greater field uniformity. FIG. 5B illustrates the characteristic I-V curve for four p-i-n (or n-i-p) diodes, 80, 82, 90 and 92. Diodes 90 and 92 are fabricated with substantially thinner (i.e., 50% thinner) than the intrinsic layers found in diodes 80 and 82 intrinsic layers, thus resulting in I-V curves characterized by substantially longer linear regions. This results in a characteristic load resistance for a conductive surface 21, as illustrated by line 86 which will pass through the linear portion of a diode's characteristic I-V curve, thereby eliminating the above discussed problems associated with diode non-uniformity.

Critical to the accurate operation of the touch sensitive position sensor 11 disclosed herein is the establishment of a uniform and linear electric field E (as in FIG. 2) across the entire conductive surface 21 thereof and a concomitant uniform and linear distribution of the orthogonally oriented current lines I thereacross. The uniform and linear lines of electric field distribution E are established by the current distribution and collection means 41 operatively disposed along the opposed boundaries of the conductive surface 21 of the sensor 11. The current distribution and collection means in conjunction with the current control means operate to linearize the electric field distribution across the conductive surface, thereby providing one important aspect of the instant invention.

In order to assure uniformity and linearity of field distribution, it is preferred that the current distribution and collection means, 51a, 51b, 61a and 61b, must possess relatively high conductivity along a first internal path of conduction taken in a direction parallel to the direction of intended current flow I upon the conductive surface 21 of the touch sensitive position sensor 11 and high impedance in a direction perpendicular thereto. This conductivity, which may be characterized as "anisotropic" allows for relatively high currents in a first direction, preferably the direction perpendicular to the plane of the conductive surface of the sensor, and relatively low current, (and preferably no current), in a second direction, preferably the direction in the plane of the conductive surface of the sensor and perpendicular to the direction of internal current flow. In the above characterization of the anisotropy provided by the current distribution and collection means, the directions of current flow and electric field equipotential are those of the electric field lines E and lines of current flow I depicted in FIG. 2.

The current distribution and collection means 41 may be formed as an off-stoichiometric silicon nitride switch, specifically adapted to prevent the deleterious effects of electrostatic discharge. Alternatively, in a preferred embodiment and as stated hereinabove, the current distribution and collection means 41 of the instant invention may be formed as an elongated, distributed diode 161b, which distributed diode is shown in FIG. 6. Such an elongated distributed diode 161b is preferably formed by a plurality of superposed, continuous thin film layers of semiconductor alloy material deposited upon a common substrate 164 of, for instance stainless steel. More particularly, the distributed diode may be affixed directly to one boundary of the conductive surface 21 of the position sensor 11, as by an electrically conductive adhesive layer 172 which adhesive is described in detail hereinafter. The diode affixed to the first boundary includes consecutively a substrate 164 upon which there is successively deposited: a layer of p-type amorphous silicon alloy material 165, a layer of substantially intrinsic silicon alloy material 167, an n-type layer of amorphous silicon alloy material 169 and a layer of a thin film, electrically conductive oxide material 171. On the opposite boundary of the conductive surface 21 of the sensor, the distributed diode will also be affixed, but the layers of semiconductor material will be deposited in reverse order. Specifically, upon the substrate 164 there is successively deposited a layer of n-type amorphous silicon alloy, a layer of intrinsic semiconductor alloy material, a layer of p-type semiconductor material and a layer of thin film conductive oxide material, (this reverse embodiment is not illustrated). It should be appreciated that in this manner, one bounded surface will have an elongated, distributed P-I-N diode disposed therealong while the opposite bounded surface will have an elongated, distributed N-I-P diode disposed therealong. With this arrangement, one set of the opposed elongated diodes can be forward biased to provide for unidirectional current flow across the conductive surface and the other set of opposed elongated diodes can be reverse biased to prevent the current flow across the conductive surface.

An example of the conductive oxide material employed herein is indium tin oxide, the sheet resistance of which can be tailored relative to the sheet resistance of the electrically conductive surface 21 of the pressure sensor 11 so as to provide relatively high lateral resistivity along the length of the diode, and so as to provide for uniform diode performance. The total thickness of the single or tandem PIN diode structure is only about 500-15,000 angstroms and preferably 1,000 to 8,000 angstroms, and may also be tailored to provide for uniform diode I–V characteristics. Further, due to its lateral resistivity, the single, elongated, distributed diode may be regarded as a plurality of discrete diode structures, such as 161ba, 163bb, 161bc, . . . 161bz. The horizontal separation between each of these discrete diodes is great enough to provide a sufficiently high impedance to current flow therebetween so that the current distribution and collection means 161b will exhibit preferential current conduction through the bulk of the distributor (in a path taken perpendicular to the conductive surface 21 of the sensor 11). The lateral resistivity of the conductive oxide must be high enough so that when that diode structure is not in its engaged or conductive mode, the conductive oxide does not distort the field flowing perpendicular thereto. It is important to note, diodes of the type described hereinabove may be patterned by standard etch techniques so as to form, for example, a plurality of individual diodes. Alternatively, the conductive oxide surface above may be patterned to affect electrical communication with adjacent structures.

As was noted hereinabove, electrostatic discharge may present a serious threat to the operation of the touch sensitive position sensor 11. Electrostatic discharges, such as those produced by a person walking across a wool rug on a dry winter day, can easily result in charging to thousands of volts. Although such electrostatic discharges usually involve relatively small total energy, they may nonetheless be sufficient to destroy the diodes employed herein.

In environments in which the possibility of electrostatic discharge exist, it is necessary to shield said diodes from its destructive effects. In a preferred embodiment, a layer of threshold switching material may be interposed between said diode means 161 and the conductive surface 21 of the position sensor 11. Said threshold switching material is characterized by a high electrical resistance state which rapidly switches to a low resistance state in response to a voltage in excess of a threshold level. Said threshold material further possesses at least one low resistance conductive path adapted to direct electrostatic discharge in excess of the threshold level away from the diode means 161. An example of a preferred chalcogenide threshold switching material is disclosed in U.S. patent application Ser. No. 107,318 to Pryor, et al for "Method Of Fabricating Stabilized Threshold Switching Material" which is incorporated herein by reference.

In an alternative embodiment, the diode means 161 may be protected from electrostatic discharge by interposing a second diode, for example a discrete Zener diode, between said diode means 161 and the conductive surface 21. Additionally, the effects of electrostatic discharge may be suppressed by slightly doping the intrinsic layer 167 of the distributed diode 161b.

Turning now to FIG. 7, there is illustrated therein a perspective, cross-sectional view of the attachment of said current distribution and collection means 41 with said resistance means 42 to said conductive surface 21. Specifically, disposed upon current lead 52a, of current distribution means 51a is a resistance means 42, which may be for example, a discrete thick film resistor screened or printed thereupon. The resistance means 42 and current lead 52a are then attached to the conductive surface 21 by means of a layer of electrically conductive adhesive. Specifically, said adhesive must be electrically conductive in a first direction and electrically resistive in at least a second direction perpendicular to the path of electrical conductivity. A material particularly adapted to this function is manufactured by Uniax under the trademark "UNIAXIAL CONDUCTIVE ADHESIVE". A second material manufactured by 3M Corporation and known as 9702 Conductive Adhesive Tape may also be employed.

Alternatively, the distributed diodes described hereinabove may be placed in electrical communication with the surface of the touch sensor 11. In a preferred embodiment, the material utilized for such a function is fabricated from a thin layer of an electrically resistive polymeric matrix material having thin electrically conductive carbon lines printed thereupon. Particularly well suited materials for this function are sold by Chinitsu under the trademark "E L FORM". Said "E L FORM" is also adapted to function as the resistance means in that said "E L FORM" possesses an inherent electrical resistance of approximately 90 ohms, a resistance sufficient to enhance and promote field uniformity and linearity. It is understood however, that other connection means (with or without associated resistance means) may be employed without departing from the spirit or scope of the present invention. This embodiment presents several advantages over other illustrated embodiments. Foremost among the advantages gained by employing this second embodiment is the ability to disconnect and/or replace individual diode which are non-functioning or performing below specification. This may be accomplished either by physically removing the "bad" section of the distributed diode and replacing it with a section of diode material which performs to specification, or by disconnecting the E L FORM attached thereto. This embodiment also provides for increased yield by allowing inoperative diode to be removed from the elongated strip of distributed diode material.

It is to be noted that the current distribution and collection means provides a rectifying junction at each test point. This can be accomplished by depositing a PIN diode structure on one rectangularly-shaped sheet of substrate material 164 and depositing a NIP diode structure on a second rectangularly-shaped sheet of substrate material 164. The conductive oxide layer of the PIN diode structure is electrically connected to the conductive lines of the "E L FORM", said "E L FORM" affixed to one boundary of the sensor 11; while the conductive oxide layer of the NIP diode structure is electrically connected to the conductive lines of "E L FORM" to the opposite boundary of the sensor. In this manner, current can flow across the conductive surface 11, but the adjacent diodes (equal in number to the number of current leads) are unable to cross-talk. It must be emphasized that only thin film semiconductor technology can provide for this type of elongated distributed diode structure wherein diodes of opposite polarities are affixed to opposite boundaries of the sensor 11.

A further advantage realized by employing thin film semiconductor technology is that diodes deposited as continuous thin film layers of semiconductor alloy material are manufactured with substantial uniformity. This uniformity arises from the fabrication of an elongated strip of distributed diode material in a continuous process, under uniform deposition conditions and utilizing substantially identical precursors. This elongated strip of multilayered, thin film semiconductor alloy material can then be cut into smaller strips of a desired size and shape. Additionally, the yield realized from the smaller strips may be increased by cutting out inoperative or "bad" diodes (diodes which do not provide uniform operational characteristics) and simply substituting operative ones. Also, by employing the hereinabove described "E L FORM", the bad diodes may be eliminated by snipping the conductive connection between the conductive surface and the distributed diode strip.

Figure 8:
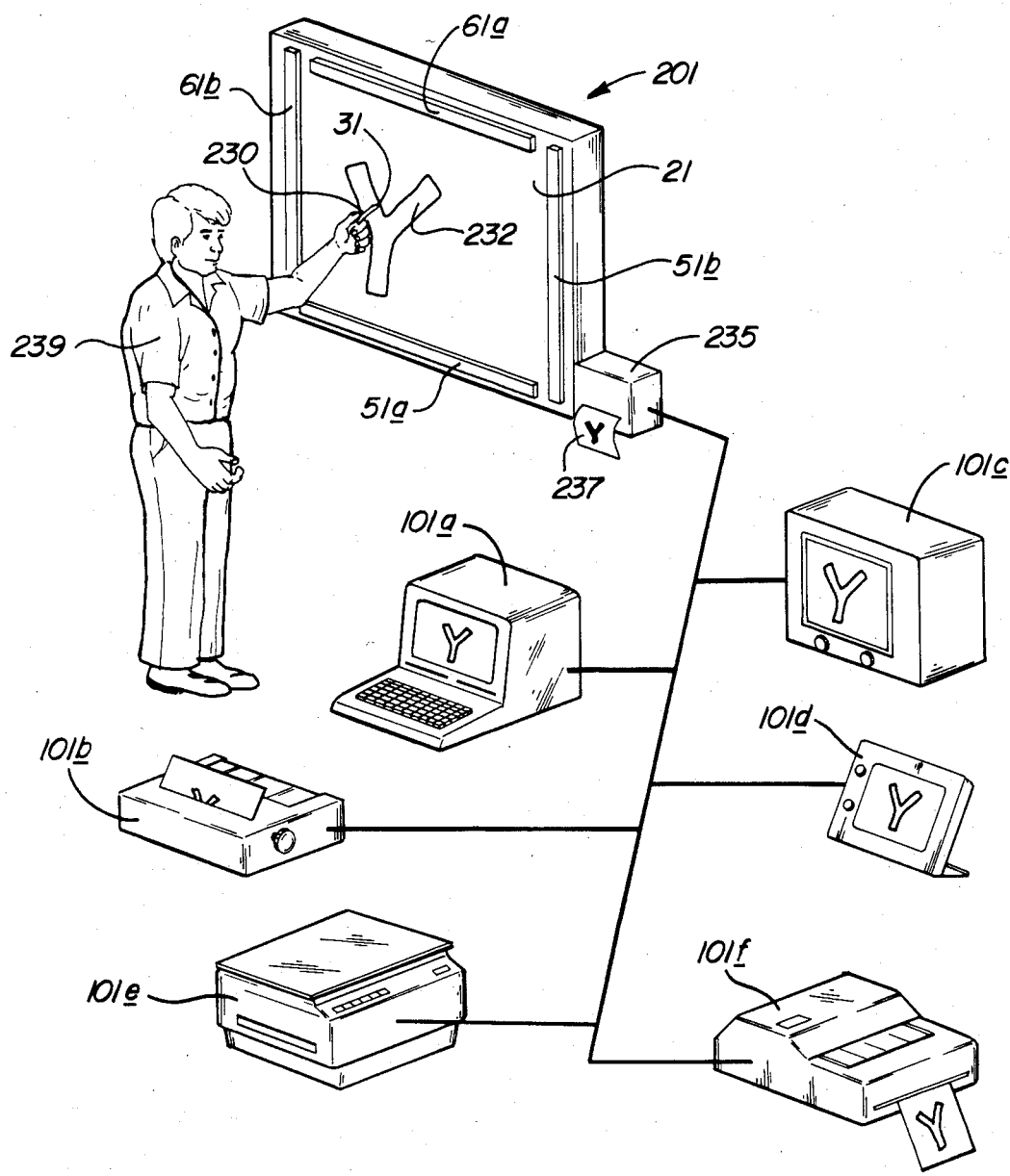
FIG. 8 is a schematic view of an integrated system in which an electronic copyboard is illustrated as incorporating the electronic touch sensitive position sensor of the instant invention, the digitized output therefrom electrically communicating with downstream data processing equipment.

The touch sensitive pressure sensor 11 of the instant invention includes means for generating an electrical signal which is indicative of the X-Y location of the touch point 31. For example, a pixel or picture element may be addressed in either vector or matrix coordinates; and a contents code for binary data, or a contents code word indicative of analog data, such as color, pitch, hue, gray scale or the like. The signal train may be stored in a memory buffer or it may be communicated to any one of a number of different output devices 101. As shown in FIG. 8, these output devices may take the form of a computer 101a, a printer 101b, a monitor 101c a display 101d, a copier 101e, or a signal transmission such as means as a telefax machine 101f. It is to be once again noted that the position sensor 11 of this invention may be affixed integrally to or otherwise form an operative part of the screen of a liquid crystal display or a CRT so as to continuously interact therewith.

The touch sensitive position sensor 11 is particularly useful when employed as part of a solid state data input and display system 201 (see FIG. 8) generally referred to as an "electronic copyboard". In an electronic copyboard, as described in the Background section hereof, visually detectable physical data images 232 are written on the exposed surface 21 thereof, for example by erasable felt-tip markers, crayons, pens, or the like, generally indicated by the reference numeral 230. Thereafter, the data images 232 formed on the conductive surface are scanned and digitized, for example with a fiber optic-charge coupled device system or a distributed array of photosensitive elements. It should thus be apparent that, prior art electronic copy boards required the visually detectable, physical data images to be physically scanned and digitized only after the entry thereof is complete.

By way of contrast thereto, the solid state data image input and display system 201 of the instant invention is specifically adapted for real time electrical signal generation. That is, physical entry of data is accomplished by writing that physical data such as 232 upon the electrically conductive surface 21 of the generally rectangularly-shaped copyboard. The generation of the electrical signals corresponding to this input data is substantially simultaneous, i.e., in real time. Such real time signal generation is accomplished in the solid state system 201 of the instant invention, without employing fiber optic systems, movable board surfaces, or movable arrays of thin film photosensitive elements. Rather, said solid state copyboard image input and display system 201 utilizes a generally rectangularly-shaped, electrically conductive image input and display surface 21, which surface may actually be fabricated as a multi-layered composite. More specifically, the surface 21 upon which the physical image 232 is drawn or otherwise input may take the form of a steel back plate with a white enamel finish covering the exposed, image-bearing surface thereof. It is upon this enamel surface that the electrically conductive layer (such as 100 ohm per square resistivity indium tin oxide) is deposited. Of course, other conductive oxides such as tin oxide, antimony-doped indium tin oxide, zinc-oxide and the like may be employed with equal advantage.

For use in this embodiment, the data entry means 230 may be a crayon, felt-tip marker, or pen adapted to carry, e.g., an inductive coil, which coil is adapted to make an electronic "mark" on the electric field distribution lines E, thereby identifying the X-Y location of said touch point 31. The electronic mark may then be scanned in the manner described hereinabove so as to provide analog information corresponding to that touch point 31. It should thus be clear that the image input and display surface 21 is adapted to have data input thereon, which data is both electrically and visually detectable. The analog output of the copyboard 201 may take the form of a thermal printer 235 from which a hard copy 237 of the data inputted onto the conductive surface 21 by the man stylistically depicted as 239 in FIG. 8, may be obtained. Alternatively, the digitized electrical signals may be communicated to such downstream processing apparatus as computer 101a, printer 101b, monitor 101c, liquid crystal display 101d, copier 101e, or telefax 101f.

The solid state electronic copyboard 201 of the instant invention includes current distribution and collection means 51a, 51b, 61a and 61b and operatively associated current control means disposed at the boundaries thereof for establishing a substantially uniform distribution of electrical field lines across the conductive surface 21 thereof. The copyboard 201 also is equipped with a stylus 230 for entering the visually detectable, physical representations, i.e., data images 232 onto that electrically conductive data input surface 21 while simultaneously creating an electronic "mark" on the display surface 21. The electronic mark 203 of the data image is preferably also a function of the color of that data image.

The erasure of data inputted onto the conductive surface of the position sensor may be handled in a manner analagous to the entry of colored data. More particularly, the erasure means is adapted to generate a unique signal so as to provide a signal of varying strength or frequency. This frequency is readily sensed by the downstream processing apparatus as relating to the erasure, vis-a-vis, the entry, of data and the digital data is removed from memory.

While the invention has been described with respect to certain preferred exemplifications and embodiments, those exemplifications and embodiments are not intended to define or otherwise limit the scope of the instant invention; but, rather the instant invention is to be defined solely by the claims appended hereto.

We claim:

1. A touch sensitive position sensor for detecting the location of a touch point thereupon, comprising:
    a. a transparent conductive oxide conductive surface;
    b. at least two pairs of elongated distributed diode current distribution and collection means, the members of each pair being substantially parallel to, facing, and spaced apart from each other on said conductive surface so as to establish an electric field thereacross, said distributed diode current distribution and collection means comprising a plurality of vertically superposed, substantially coextensive thin film layers of semiconductor alloy material deposited upon a substrate;
    c. current control means, operatively associated with said elongated distributed diode current distribution and collection means, to sequentially turn on one pair of said elongated distributed diode current distribution and collection means and simultaneously turn off another pair of said elongated distributed diode current distribution and collection means; and
    d. means for determining the distribution of the electric field across the conductive surface and correlating the distribution of the electric field with the location of the touch point.

2. A sensor as in claim 1 further including electrical resistance means electrically in series with and interconnecting said distributed diode current distribution and collection means and said transparent conductive oxide conductive surface to assure that the flow of current remains substantially upon the transparent conductive oxide conductive surface of the touch position sensor.

3. A sensor as in claim 2, wherein said resistance means provides a resistance of 10 to 1000 ohms, in series with said current distribution and collection means and said conductive surface.

4. A sensor as in claim 3, wherein said resistance is between about 50 to 500 ohms.

5. A sensor as in claim 2 wherein the electrical resistance means electrically interconnect said distributed diode current distribution and collection means with said transparent conductive oxide conductive surface; said electrical resistance means having an inherent resistance of 50 to 500 ohms.

6. A sensor as in claim 5, wherein said electrical resistance means are formed of a graphitic material.

7. A sensor as in claim 1, wherein said distributed diode means further includes overvoltage protection means operatively associated therewith, said protection means adapted to inhibit the deleterious effects of electrostatic discharge.

8. A sensor as in claim 7, wherein said protection means comprise a chalcogenide glass threshold switch.

9. A sensor as in claim 7, wherein said protection means comprise a Zener diode interposed between said conductive surface and said distributed diode.

10. A sensor as in claim 1, wherein one of a set of said current distribution and collection means include superposed layers of PIN semiconductor alloy material and the other of said set of current distribution and collection means include superposed layers of NIP semiconductor alloy material.

11. A sensor as in claim 1, wherein said current distribution and collection means are disposed along each of the boundaries of the bounded conductive surface.

12. A sensor as in claim 11, wherein the bounded surface is configured as a substantially planar, four sided rectangle; whereby a touch point on that surface may be uniquely defined by an X-Y coordinate.

13. A sensor as in claim 1, wherein the current distribution and collection means are electrically connected directly to said bounded conductive surface, by means of an electrically conductive adhesive material.

14. A sensor as in claim 1, wherein said distribution determining and correlating means communicates with an output display device, said display device selected from the group consisting of: computer means, monitor means, memory means, liquid crystal display means, printer means, modem means and copier means.

15. A sensor as in claim 1, wherein said distributed diode means have a characteristic I-V curve; said distributed diode means adapted to operate within the linear section of said characteristic I-V curve.

16. A sensor as in claim 14, wherein said conductive surface is transparent and disposed immediately atop said output display device.

17. A sensor as in claim 1, further including marker means for providing a visually detectable mark on said bounded conductive surface and including metallic means for creating an electronic touch point upon said surface.

18. A sensor as in claim 17, wherein said marker further includes means for providing a signal indicative of the color thereof.

19. A sensor as in claim 17, further including electrical erasure means adapted to simultaneously erase marks formed on said bounded conductive surface and on the display associated therewith.

20. A sensor as in claim 1, wherein said transparent conductive oxide is selected from the group consisting essentially of indium tin oxide, tin oxide, zinc oxide, antimony doped tin oxide, and combinations thereof.

21. A touch position sensor as in claim 1 further including anisotropically conducting electrical resistance means electrically in series with and interconnecting said distributed diode current distribution and collection means and said transparent conductive oxide conductive surface to assure that the flow of current remains substantially upon the transparent conductive oxide conductive surface of the touch position sensor.

* * * * *